United States Patent [19]
Fellenstein

[11] 3,829,151
[45] Aug. 13, 1974

[54] TONNEAU COVER AND SEAT ASSEMBLY FOR PICKUP-TYPE VEHICLE BOXES

[76] Inventor: Ronald L. Fellenstein, 1410 W. Holly Dr., Broomfield, Colo. 80020

[22] Filed: Oct. 3, 1972

[21] Appl. No.: 294,603

[52] U.S. Cl. .................................... 296/64, 296/100
[51] Int. Cl. ............................ B60n 1/00, B60p 7/02
[58] Field of Search ............ 296/64, 63, 66, 69, 10, 296/100

[56] References Cited
UNITED STATES PATENTS
| | | | |
|---|---|---|---|
| 2,880,033 | 3/1959 | Shelton | 296/66 |
| 3,323,828 | 6/1967 | Esche | 296/63 |
| 3,512,828 | 5/1970 | Craft | 296/100 |

FOREIGN PATENTS OR APPLICATIONS
| | | | |
|---|---|---|---|
| 45,124 | 4/1928 | Norway | 296/66 |

Primary Examiner—David Schonberg
Assistant Examiner—John A. Pekar
Attorney, Agent, or Firm—Ancel W. Lewis, Jr.

[57] ABSTRACT

A tonneau cover and rumble-type seat assembly for the box of a pickup-type vehicle wherein a tonneau cover is provided with an access opening and a convertible seat and closure are operatively associated with the tonneau cover. In one position the seat seats passengers in the box and the seat is movable to another position to close off the access opening.

11 Claims, 11 Drawing Figures

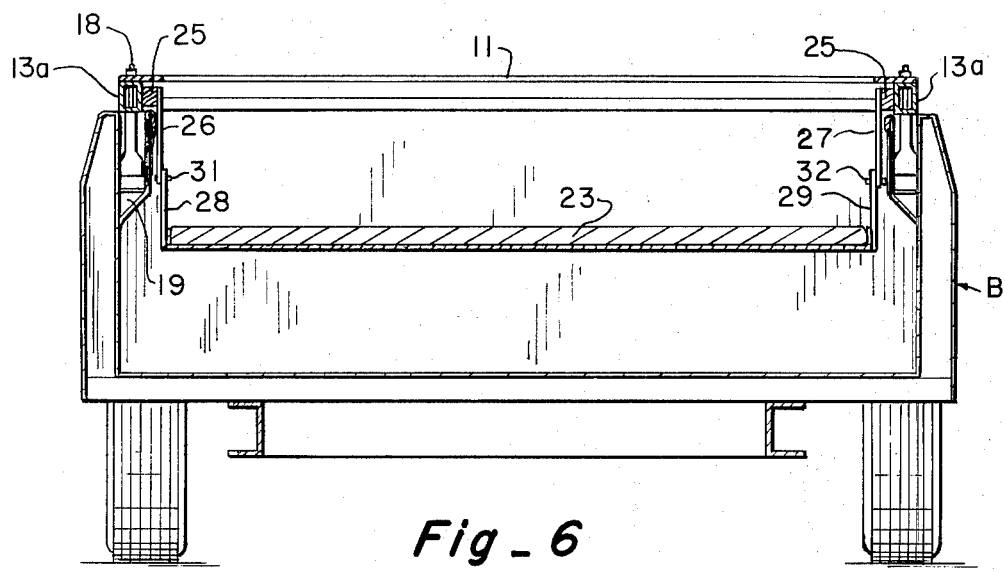
Fig_6
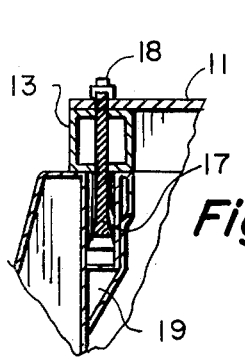
Fig_7
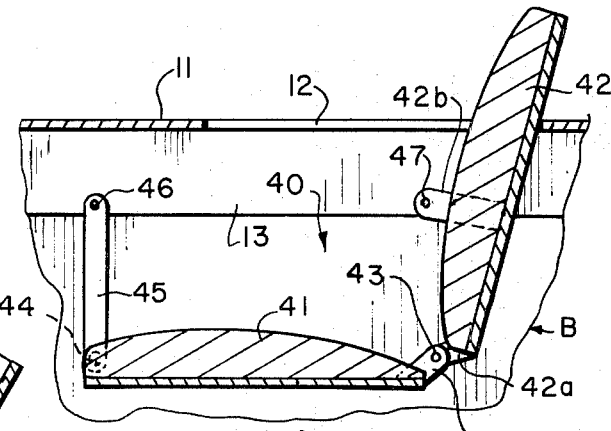
Fig_8
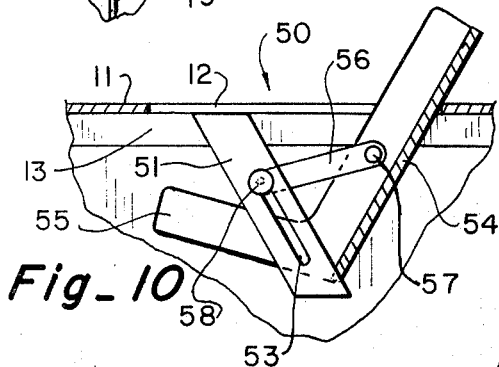
Fig_10
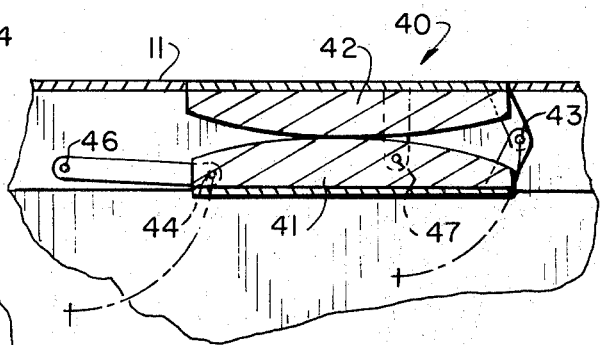
Fig_9
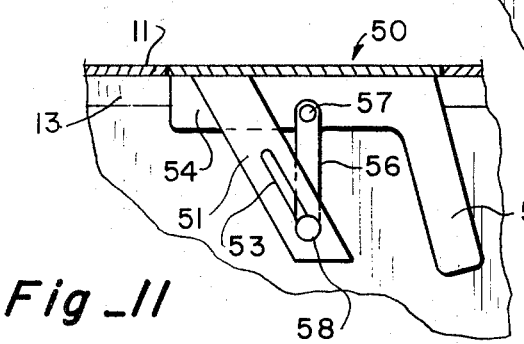
Fig_11

TONNEAU COVER AND SEAT ASSEMBLY FOR PICKUP-TYPE VEHICLE BOXES

BACKGROUND OF THE INVENTION

This invention relates to motor vehicle accessories and more particularly to a novel cover and convertible seat and closure for pickup-type vehicles.

In recent years, pickup-type vehicles with a rear box have become more popular for passenger transportation. Tonneau covers in the form of a canvas cover or the like have been used to cover pickup boxes to keep interior articles from the weather and the like and no known attempts have been made to provide relatively comfortable open seating in the box of a pickup-type vehicle.

Accordingly, it is an object of this invention to provide a relatively comfortable passenger seat in the box of a pickup-type vehicle affording relatively comfortable transportation of passengers.

Another object of this invention is to provide a tonneau cover and seat assembly for a pickup-type vehicle which readily converts from functioning only as a cover for the box by moving a closure forming at least a part of the seat over an opening in the cover to provide a passenger seat in the pickup box.

Still a further object of this invention is to provide a novel tonneau cover and the rumble seat assembly characterized by having an access opening in the tonneau cover and a rumble-type seat supported from below the access opening and movable between a passenger-supporting position and a closed position closing off the access opening.

SUMMARY OF THE INVENTION

In accordance with the present invention in the preferred forms shown there is provided a demountable tonneau cover with an access opening and a convertible seat and closure operatively supported from under the opening forming with the cover and pickup box on which is mounted a rumble compartment to support passengers on the seat in one position. The cover preferably is made of a rigid sheet material mounted on a frame. The cover may be formed in two sections hinged together to provide access into the vehicle box via the tonneau cover. In a preferred form, the convertible seat and closure includes a base section and a back section pivotally connected to one another at a common pivot and the sections are supported so that the back sides thereof move to form the top face of the closure for the access opening. In another form the base and back sections are again pivotally connected to one another at a pivot and arranged so that the back side of the back section folds down about a pivot to close off the opening. In yet another form the base and back sections are integral with one another and are pivotally mounted to invert so that the back side of the back section closes off the access opening.

Other objects, advantages and capabilities of the present invention will become more apparent as the description proceeds taken in conjunction with the accompanying drawings in which:

FIG. 6 is an enlarged sectional view taken along lines 6—6 of FIG. 1;

FIG. 7 is an enlarged vertical sectional view through the stake pocket showing the anchoring of the frame and cover in a stake pocket;

FIG. 8 is a vertical sectional view of another form of convertible seat and closure disposed in an open passenger seating position;

FIG. 9 is a vertical sectional view of the convertible seat and closure of FIG. 8 disposed in the closed position;

FIG. 10 is a vertical sectional view of another form of convertible seat and closure in an open passenger seating position;

FIG. 11 is a vertical sectional view of the convertible seat and closure of FIG. 10 in the closed position.

DESCRIPTION OF THE PREFERRED EMBODIMENTS

Figure 1:
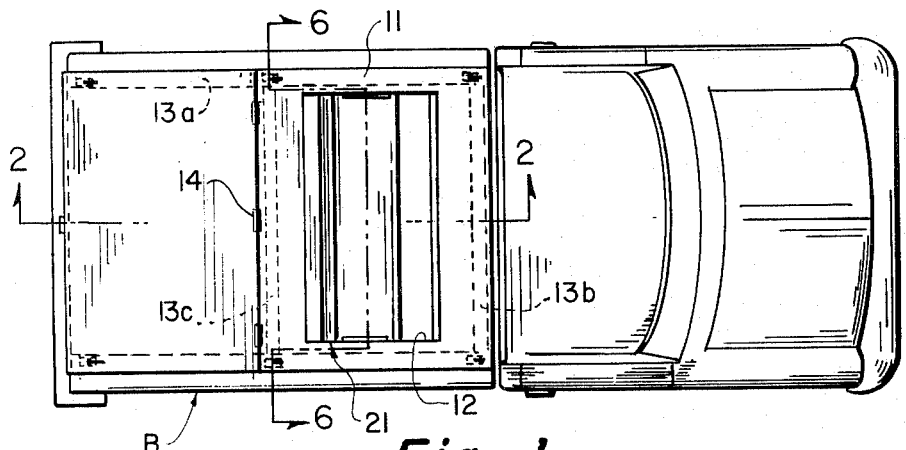
FIG. 1 is a top plan view of a preferred form of tonneau cover and seat assembly embodying the present invention.
Figure 2:
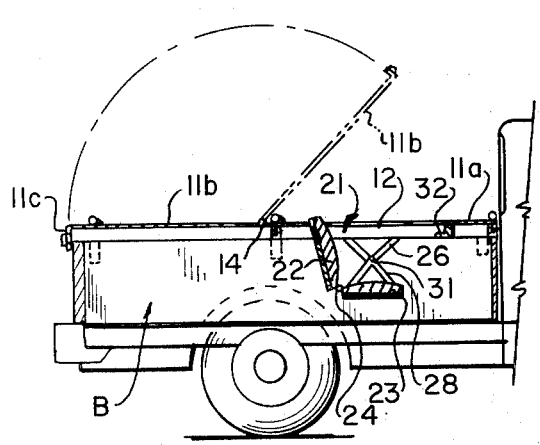
FIG. 2 is a sectional view taken along lines 2—2 of FIG. 1.
Figure 5:
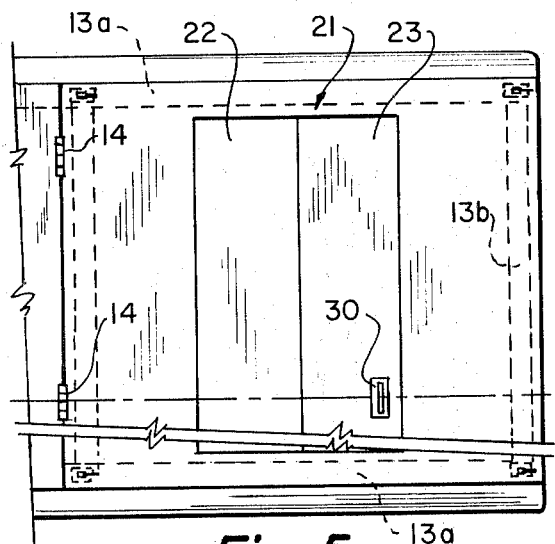
FIG. 5 is a top plan view of FIG. 4.

Referring now to the drawings, in FIGS. 1 through 6 there is shown a preferred form of tonneau cover and seat assembly comprising a cover 11 for the box of a pickup represented at B with the cover having a relatively large opening 12 in a central portion thereof. The opening extends almost the full width of the cover to afford maximum seat width. The cover 11 shown is made from a flat, rigid, weather resistant, sheet material such as fiberglass, which is mounted on a rigid frame 13 sized to seat down or rest on top of the box B. It is understood that the cover may also be made of a flexible weather resistant material such as canvas secured to frame 13. The cover 11 shown is made in a front section 11a and a rear section 11b hingedly connected by hinges 14 to permit the rear section to swing open and afford access into the pickup box while the front section remains in place. A rear dependent section 11c overhangs the tailgate of the box and may be releasably locked by a suitable lock 15 such as a key-operated cylinder lock so that the cover may close the box against access.

The frame 13 shown is made of metal tubing of square cross-section and comprises laterally spaced side members 13a and a forward cross member 13b and an intermediate cross member 13c secured at the ends to the side members leaving the back end of the frame 13 open. The intermediate cross member 13c is located forwardly of hinges 14. Dependent anchor members 17 are secured to frame 13 with expandable and retractable sections actuated by a suitable cam lever 18 or the like to engage the walls of the stake pockets 19 to fasten the frame and cover to the box with the cover 11 closing off the top of the box B. While a cam-type lever operated anchor member is represented it is understood that other types of hold-down devices may be used to releasably fasten the cover on the box.

A convertible seat and closure 21 is operatively associated with the cover opening 12 and generally stated is recessed in the opening. The convertible seat and closure 21 is shown in the passenger carrying position in FIGS. 1, 2 and 6 and the closed position in FIGS. 4 and 5. The convertible seat and cover closure 21 is made of a back section 22 and a base section 23 which are pivotally or hingedly connected together along a common side by a hinge or pivot 24. As best seen in FIG. 6, a pair of generally V-shaped support arms 26 and 27 are affixed at their divergent ends to the side members 13a of the frame 13 and depend therefrom. A spacer block 25 is shown between side members 13a and the support arms so that the support arms clear the pockets. The base section 23 carries a pair of inverted V-shaped brackets 28 and 29 affixed along each side thereof to form with the base section a triangular configuration. Brackets 28 and 29 pivot on pivots 31 and 32 respectively, at their apexes to the apexes of associated support arms 26 and 27, respectively.

Figure 3:
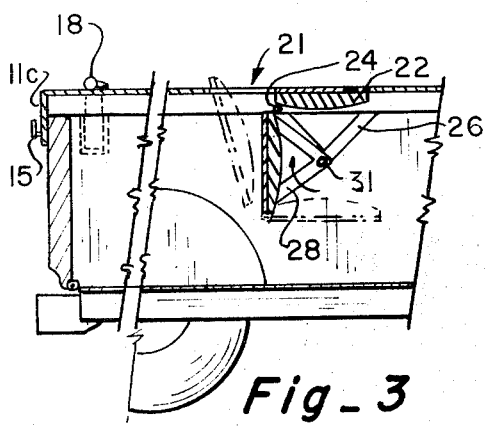
FIG. 3 is an enlarged sectional view showing the convertible seat and closure of FIGS. 1 and 2 in an intermediate position.
Figure 4:
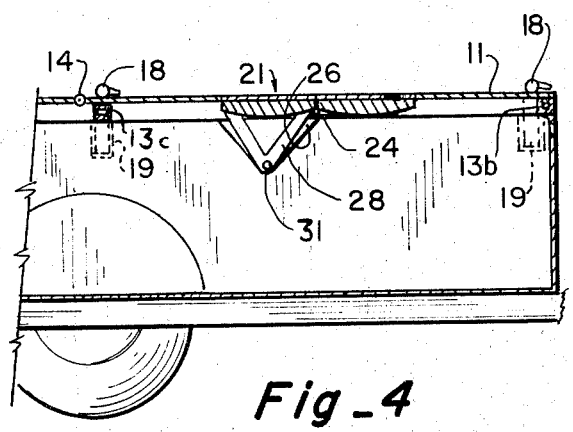
FIG. 4 is an enlarged sectional view showing the convertible seat and closure of FIGS. 1-3 in a closed position closing off the cover opening.

To move the back and base sections to the closed position the back section 22 is pulled forwardly as by gripping a handle 30 on the back side of the inverted V-shaped support brackets 28 and 29 on the base sections swing about the pivot 31 in a clockwise direction as shown in FIG. 3 and the rear faces the sections move to lie in a common plane to form the top surface of the cover. The forward edge of the back section rests on a ledge 32 extending from the underside of the cover at the forward edge of the recess. The base and back sections are shown as provided with a sheet having the same thickness as the cover to form the closure and a cushion portion is mounted on one side of the closure sheet. The style of the cushion portion of the seat may take a variety of forms. A suitable seal arrangement may be provided around the edges of the access opening and closure to prevent leakage.

Another form of convertible seat and closure 40 shown in FIGS. 8 and 9 has a base section 41 pivotally or hingedly connected to a back section 42 using ear-like projections 41a and 42a on sections 41 and 42, respectively, joined at a common pivot 43. Again the base and back sections are supported from or carried by the frame 13 on which the cover 11 is mounted. The forward end of the base section 41 is pivotally connected along each side of the frame at a pivot 44 attached to the lower end of a link arm 45 which in turn is pivotally connected to the frame at a pivot 46 on a horizontal line with pivot 47 pivotally supporting link arm 42b located at an intermediate point forwardly of the back section 42. In this arrangement the back section 42 is folded or pivoted forwardly about pivot 47 until the back side or back face thereof is in a flush relation with the cover 11 and this closes off the opening 12. The common pivot 43 swings up in a counterclockwise direction and the link arm 45 swings about pivot 46 in a counterclockwise direction as shown in the drawings almost 90 degrees so that the base section 41 is brought up under the folded back section 42. A spring biasing arrangement may be coupled between the cover and base seat section to assist in moving the sections to the closed position.

The convertible seat and closure 50 shown in FIGS. 10 and 11 utilizes a pair of downwardly and rearwardly inclined support arms 51 fixedly secured to each of the side members of the frame 13 and depending therefrom each with an elongated slot 53. The seat comprises a base seat section 54 and a back seat section 55 which are fixedly secured together or made integral with one another. A link arm 56 has a fixed pivot 57 on an intermediate portion of the back section of the seat and a sliding pivot 58 movable in slot 53. In the closed position for the seat the link arm 56 is substantially vertical and in the open position the link approaches the horizontal. The seat is moved to the closed position by pivoting the back forwardly and swing it so that the back face becomes the closure for the opening in the tonneau cover.

From the foregoing it is apparent that the present invention contemplates a tonneau cover with an access opening and a convertible seat and closure arrangement which in the alternative will either seat passengers or move to close the opening. This affords additional comfortable seating in the back of a pickup and affords added safety for children in that safety belts may readily be installed. This arrangement also affords an open-air, rumble seat-type transportation which is distinct from ordinary automotible transportation.

Although the present invention has been described with a certain amount of particularity, it is understood that the present disclosure has been made by way of example and that changes in details of structure may be made without departing from the spirit thereof.

What is claimed is:

1. In a tonneau cover and seat assembly for a substantially rectangular box of a pickup-type vehicle having a top opening in a substantially horizontal plane and adapted to carry cargo, the combination comprising:
    a substantially rectangular cover disposed in a substantially flat plane for the vehicle box, said cover having an opening, said cover being removably mounted on the box and having means for releasably fastening the cover to the box; and
    convertible seat and closure means operatively associated with the cover opening inclusive of a back seat section and a bottom seat section supported from the cover to provide a seat arrangement in the box when disposed in a passenger seating position and movable from the passenger seating position to a closed position wherein the opening is closed.

2. In a tonneau cover and seat assembly as set forth in claim 1 wherein said cover is in the form of a rigid sheet material sized to cover and rest on top of the vehicle box.

3. In a tonneau cover and seat assembly as set forth in claim 1 wherein said sheet material is made of fiberglass.

4. In a tonneau cover and rumble seat assembly as set forth in claim 1 wherein said cover is mounted on a support frame adapted to releasably mount on the vehicle box.

5. In a tonneau cover and rumble seat assembly as set forth in claim 1 wherein the rear of said cover is releasably locked to the tailgate of the vehicle box.

6. In a tonneau cover and seat assembly for the box of a pickup-type vehicle, the combination comprising:

a cover for the vehicle box having an opening; and
    convertible seat and closure means operatively associated with the cover opening to provide a seat arrangement in the box when disposed in a passenger seating position and movable from the passenger seating position to a closed position wherein the opening is closed,
    said cover being in the form of a rigid sheet material sized to cover and rest on top of the vehicle box, said cover being made as a front section and a rear section pivotally connected to the rear section to swing open relative thereto to provide access into the vehicle box.

7. In a tonneau cover and seat assembly for a box of a pickup-type vehicle, the combination comprising:
a cover for the vehicle box having an opening,
convertible seat and closure means operatively associated with the cover opening to provide a seat arrangement in the box when disposed in a passenger seating position and movable from the passenger seating position to a closed position wherein the opening is closed,
said cover being in the form of a rigid sheet material sized to cover and rest on top of the vehicle box,
said cover being mounted on a support frame adapted to releasably mount on the vehicle box,
said support frame having dependent anchor members adapted to insert into the stake pockets of the vehicle box, and
said dependent anchor member having expandable and retractable portions to releasably anchor the leg portions in the stake pockets of the vehicle box.

8. In a tonneau cover and seat assembly as set forth in claim 7 wherein said convertible seat and closure means includes a back section and a base section pivotally connected together at adjacent side edges, said base section having upright support arms affixed along each side thereof, said support arms depending from the sides of said frame and pivotally connected to said upright support arms whereby the base section pivots about said pivot and the back of said sections move up to an inverted position closing the opening.

9. In a tonneau cover and seat assembly as set forth in claim 7 wherein said convertible seat and closure means includes a back section and a base section pivotally connected together at adjacent side edges, said base section being pivotally supported at its forward end by a depending pivotal support arm, said back section being pivotally mounted at an intermediate forward point whereby as the back section is folded down about said forward pivot to close the opening the base section swings up under the back section.

10. In a tonneau cover and seat assembly as set forth in claim 7 wherein said convertible seat and closure means includes a back section and base section connected together as an integral seat, said support frame having forwardly and rearwardly inclined support arms at each side with an elongated slot, a link arm for each support arm having a sliding pivot in the slot and a pivot at an intermediate part of said base section whereby the base section closes the opening.

11. In a tonneau cover and rumble seat assembly adapted to mount on a substantially rectangular box of a pickup-type vehicle having a top opening in a substantially horizontal plane and adapted to carry cargo and having stake pockets, the combination comprising:

a rigid, weather-resistant sheet material forming a substantially rectangular cover disposed in a substantially flat plane for the pickup box, said cover having an access opening extending substantially the width thereof;
a support frame under the cover having depending anchor members releasably inserted into the stake pockets of the vehicle box to releasably secure the cover to the box;
convertible seat and closure means including a base section and a back section supported by a pair of support arms depending from the frame to provide a rumble seat arrangement suitable for seating passengers in one position, said back and base section being movable to a closed position wherein the access opening is closed off by the back side of at least one of said base and back sections which is coplanar with the cover in the closed position.

* * * * *